United States Patent
Adleff

(10) Patent No.: US 8,047,782 B2
(45) Date of Patent: Nov. 1, 2011

(54) HYDRODYNAMIC MACHINE, ESPECIALLY HYDRODYNAMIC COUPLING, OF A TURBINE COMPOUND SYSTEM

(75) Inventor: Kurt Adleff, Crailsheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 498 days.

(21) Appl. No.: 12/275,567

(22) Filed: Nov. 21, 2008

(65) Prior Publication Data

US 2009/0136340 A1    May 28, 2009

(30) Foreign Application Priority Data

Nov. 22, 2007 (DE) .................. 10 2007 056 526

(51) Int. Cl.
*F01D 25/12* (2006.01)
(52) U.S. Cl. .................. 415/215.1; 416/180; 416/197 C
(58) Field of Classification Search .................. 60/330, 60/364, 366; 415/215.1; 416/180, 197 C
See application file for complete search history.

(56) References Cited

U.S. PATENT DOCUMENTS

| | | | |
|---|---|---|---|
| 3,476,219 A | | 11/1969 | Lauer |
| 6,016,894 A | * | 1/2000 | Kundermann ................. 192/3.3 |
| 6,223,872 B1 | * | 5/2001 | Heller et al. ................. 192/3.29 |
| 6,354,413 B2 | * | 3/2002 | Heller et al. ................. 192/3.29 |
| 6,374,601 B1 | * | 4/2002 | Sudau ............................. 60/326 |
| 6,428,276 B1 | * | 8/2002 | Chasseguet et al. .......... 416/180 |
| 6,516,928 B2 | * | 2/2003 | Sasse et al. ................. 192/3.28 |
| 6,595,335 B2 | * | 7/2003 | Schroder ..................... 192/3.29 |
| 2001/0027286 A1 | * | 10/2001 | Schroder ........................... 604/1 |

FOREIGN PATENT DOCUMENTS

| | | |
|---|---|---|
| DE | 102004003949 A1 | 8/2005 |
| DE | 102004011521 A1 | 9/2005 |
| GB | 1123093 A | 8/1968 |
| GB | 1146840 A | 3/1969 |
| JP | 6113033 A | 4/1994 |

* cited by examiner

Primary Examiner — Gary F. Paumen
(74) Attorney, Agent, or Firm — Taylor IP, P.C.

(57) ABSTRACT

A hydrodynamic machine, and especially a hydrodynamic coupling, for a turbine compound system includes (a) a bladed primary wheel and a bladed secondary wheel which together form an operating space which is filled or can be filled with operating medium, and (b) a housing which encloses the primary wheel and the secondary wheel and which is manufactured from sheet metal. The housing is manufactured from at least two separate sheet metal components which are placed on the primary wheel and/or the secondary wheel, are aligned with each other at a joint abutment location, and are welded together. In the area of the welded joint abutment, a relief which is open toward the joint abutment is provided and which extends along the joint abutment in the surface of the primary wheel and/or the secondary wheel.

16 Claims, 1 Drawing Sheet

HYDRODYNAMIC MACHINE, ESPECIALLY HYDRODYNAMIC COUPLING, OF A TURBINE COMPOUND SYSTEM

BACKGROUND OF THE INVENTION

1. Field of the Invention

The current invention relates in general to a hydrodynamic machine and especially a hydrodynamic coupling in a turbine compound system.

2. Description of the Related Art

As is generally known, hydrodynamic machines, such as hydrodynamic couplings, include hydrodynamic retarders, and also hydrodynamic converters include a primary wheel and a secondary wheel which together form a work space which is filled or can be filled with operating medium and in which through driving the primary wheel an operating medium circulation is caused which transfers torque or respectively power to the secondary wheel. In a hydrodynamic coupling the primary wheel is also referred to as pump wheel and the secondary wheel as turbine wheel.

Such hydrodynamic machines include a housing which can be connected to one of the two blade wheels—primary wheel or secondary wheel—and which then together with the blade wheel to which it is connected envelopes the respective other blade wheel in axial direction. Alternatively a housing can be provided which envelopes both blade wheels in circumferential and/or axial direction, whereby it is connected rotationally fixed or whereby it is stationary or whereby it circulates at a different speed than both blade wheels.

A housing which is connected to one of the two blade wheels is conventionally connected with the respective blade wheel through screw connections or by welding on. The German patent application DE 10 2004 011 521 A1 for example describes a hydrodynamic coupling in a turbine compound system in which a single component deep-drawn housing is slid over the pump wheel onto a drive gear which is connected to the pump wheel and is welded to it. This solution is however only possible without additional shaping of the housing after this is slid over the pump wheel if the point of tie-in of the housing on the drive gear has a diameter which is at least of the same dimension or larger than the outside diameter of the pump wheel. In addition, an undesirable heat input into the pump wheel could occur during the process of welding the housing to the drive gear due to the selected design which can lead to distortion of the pump wheel or to material changes in the pump wheel.

What is needed in the art is a hydrodynamic machine, especially a hydrodynamic coupling, in a turbine compound system in which a sheet metal housing can be mounted cost effectively, securely and without the mentioned disadvantages. In addition, a method for the production of a hydrodynamic machine or respectively, for the installation of an appropriate sheet metal housing, is to be cited.

SUMMARY OF THE INVENTION

The present invention provides a hydrodynamic machine, especially hydrodynamic coupling for a turbine compound system, including a bladed primary wheel and a bladed secondary wheel which together form a work space, and including a housing, which encloses the primary wheel and the secondary wheel and which is manufactured of sheet metal, characterized in that the housing consists of at least two individual sheet metal components which are placed on the primary wheel and/or the secondary wheel, are aligned with each other at a joint abutment location and are welded together, and in that in the area of the welded joint abutment a relief which is open toward the joint abutment is provided and which extends along the joint abutment in the surface of the primary wheel and/or the secondary wheel.

An inventive hydrodynamic machine, especially a hydrodynamic coupling or hydrodynamic retarder, includes a bladed primary wheel and a bladed secondary wheel which together form an operating space which is filled or can be filled with operating medium. In addition, a housing is provided which includes the primary wheel as well as the secondary wheel. The two blade wheels are for example completely enclosed in circumferential direction by the housing, as well as being enclosed on both sides by the housing in axial direction. The housing may for example start on the side of the primary wheel which faces away from the operating space in the area of the central diameter or radially inside the central diameter of the operating space.

It may further extend radially toward the outside across the largest diameter of the blade wheel, in axial direction in the direction of the other blade wheel, then, radially again toward the inside and end there, especially exposed advantageously again radially in the area of the central diameter of the operating space or inside the central diameter of the operating space.

According to the invention the housing is constructed of sheet metal, whereby the sheet metal is particularly sheet steel or another metallic sheet metal. However any material which can be welded is conceivable. The housing consists of at least two separately produced sheet metal components, or in other words of two metal parts which are initially not connected to each other or which, in special cases are hinged or are connected to be movable relative to each other at individual locations and which subsequently are rigidly connected with each other through welding and together are joined with the housing. For this purpose the two sheet metal parts are first appropriately aligned on the primary wheel and/or the secondary wheel and are accordingly placed side by side, either to be in immediate contact with each other, or at a predetermined small distance from each other. Subsequently the two sheet metal components are welded to each other on the primary wheel and/or the secondary wheel.

In order to avoid an undesirable heat input into the primary wheel or respectively the secondary wheel, it is equipped with a recess in the area of the joint abutment which is open toward the location of the joint and which progresses along the joint abutment. It could also be said that the recess which extends especially in circumferential direction, advantageously over the entire circumference of one of the two blade wheels, for example the primary wheel is shaped such and the two individual sheet metal parts are placed over said recess such that the edges of the two sheet metal parts which are to be welded together protrude over the two edges of the recess in the direction of the center of the recess. Thereby there is no contact between the ends of the recess which are to be welded together and the corresponding blade wheel.

In the broadest sense of the current invention the term "primary wheel" includes any component rotating with the input torque of the hydrodynamic machine and especially any component connected with the bladed area of the primary side. The term "secondary wheel" accordingly includes any component rotating with the output torque of the hydrodynamic machine and especially any component connected with the bladed area of the secondary side.

According to one inventive design form the sheet metal housing consists exclusively of two sheet metal parts which are welded together. According to another design form it is obviously possible to provide more than two sheet metal components for the construction of the housing which are welded together or, other than being welded together may also be joined together by another way.

The inventive method to weld the two sheet metal parts together in the area of the recess in the blade wheel prevents an undesirable heat input into the blade wheel during welding. In the location where individual sheet metal parts of the housing are welded together or, respectively at a welding location where the housing is connected with another component it is especially advantageous to provide an appropriate recess in the blade wheel or in a component connected to said blade wheel which is open toward the welding location.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one embodiment of the invention, and such exemplifications are not to be construed as limiting the scope of the invention in any manner.

DETAILED DESCRIPTION OF THE INVENTION

Figure 1:
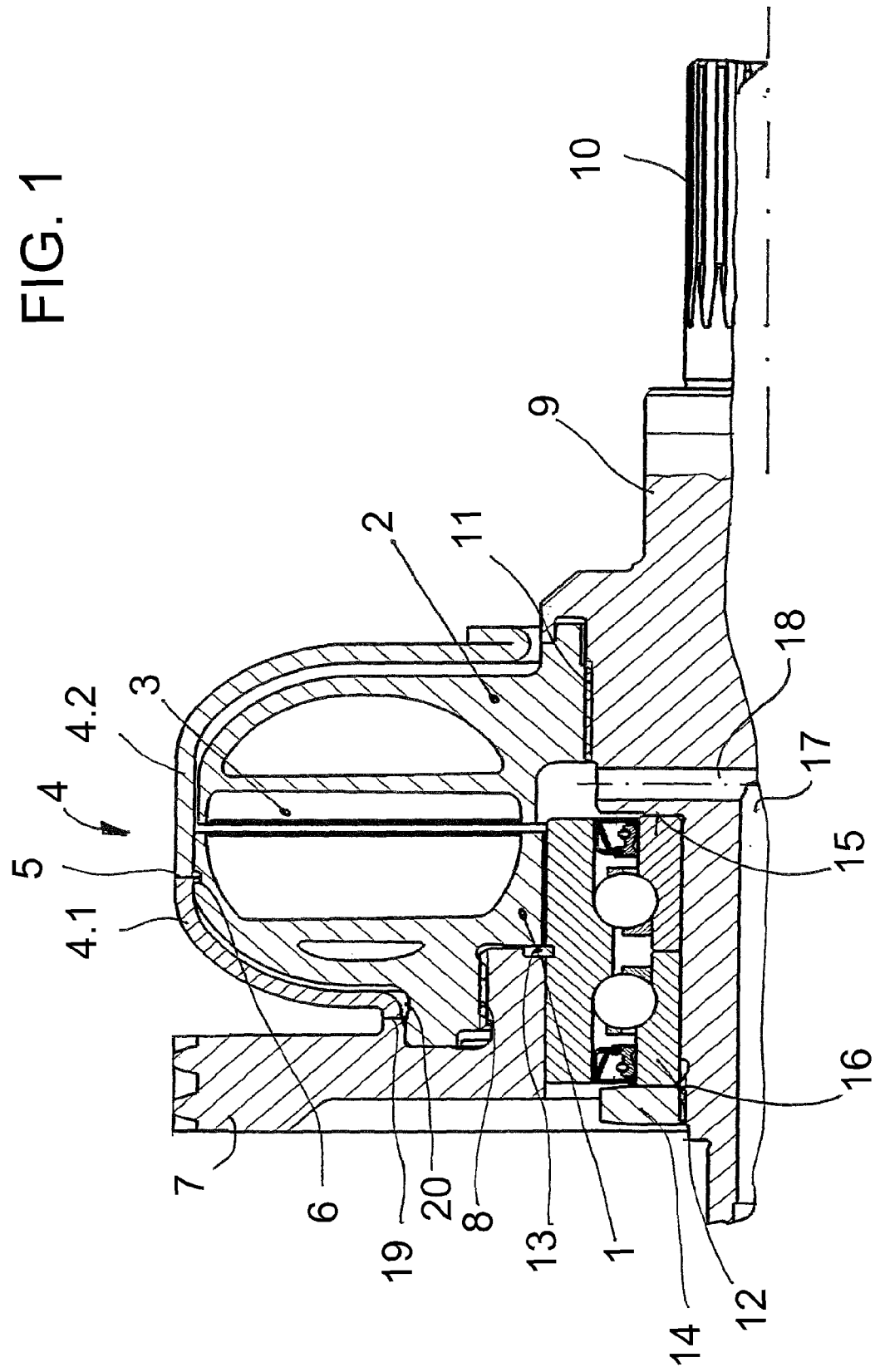
FIG. 1 illustrates a hydrodynamic coupling for a turbine compound system.

Referring now to FIG. 1, there is shown a hydrodynamic coupling for a turbine compound system, that is for a drive connection between an exhaust gas turbine in the exhaust flow of an internal combustion engine and the drive shaft, usually crank shaft of the internal combustion engine. The hydrodynamic coupling includes a primary wheel 1, also referred to as pump wheel, as well as a secondary wheel 2, also known as turbine wheel. The two blade wheels respectively are equipped with blades, and together define a toroidal work space 3. No stator is provided.

The hydrodynamic coupling includes a drive gear 7 which provides a drive connection with the primary wheel 1. In the current example the drive gear 7 is screwed into the primary wheel 1—see screw thread 8. In order to ensure a secure retention between the two components the screw thread 8 can be caulked after the drive wheel 7 has been screwed into the primary wheel 1.

The secondary wheel 2 is screwed onto a drive shaft 9 in an appropriate manner, whereby the drive shaft 9 may for example be equipped with, or supports, a pinion gear 10. The connection between the secondary wheel 2 and the drive shaft 9 is thereby exclusively provided through the screw thread 11. In the case of both blade wheels an additional screw connection with their drives, or respectively drive components can be dispensed with.

The primary wheel 1 is mounted relatively through a bearing, preferably a double bearing, on the drive shaft 9. In the illustrated example the bearing is an antifriction bearing 12. The outside bearing ring is held through a retaining element or retaining ring 13 which engages into said outer bearing ring and which is mounted between the drive gear 7 and the primary wheel 1. The inside bearing ring is held through a nut 14 and a relief 15 in the drive shaft 9, or respectively mounted between these two components, whereby the nut 14 is again screwed onto a screw thread 16 on the drive shaft 9.

Filling of the operating space 3 with operating medium occurs through an axial bore 17 and one or a plurality of radial bores 18 in the drive shaft 9.

As can be seen in FIG. 1 the sheet metal housing 4 is composed of two individual sheet metal parts 4.1 and 4.2. In the area of the radial outside circumference of the primary wheel 1 the two sheet metal parts 4.1 and 4.2 abut, so that in the illustrated example a joint abutment 5 results which extends in radial direction. The sheet metal parts 4.1, 4.2 are positioned flushed against each other at the joint abutment location and are aligned with each other with their inside and outside surfaces and are welded together, especially by way of laser welding. In the existing example the inside surfaces at the same time fit against the outside circumference of the primary wheel 1, especially radial outside the axial area with the blading of the primary wheel 1.

A relief 6 is provided in the primary wheel in the area of the joint abutment 5 which is open in the direction of the two sheet metal parts 4.1, 4.2, or respectively the joint abutment location 5. This relief 6 provides the necessary distance between the joint abutment 5 which is thermally exposed during welding and the material of the primary wheel 1. This is especially important if the primary wheel 1 is manufactured from another material than the housing 4, for example of aluminum, especially pressure die cast aluminum.

In addition, the first sheet metal component 4.1 is welded at its axial end which faces away from the joint abutment 5 to a collar of the driving gear 7. Here too, a second joint abutment 19 extending in radial direction of the hydrodynamic coupling is defined between the housing 4 and the driving gear 7 at which the two components are welded together, especially again by way of laser welding. Here to, a corresponding groove 20 can be provided in the primary wheel 1 and/or the driving gear 7 which is open in the direction of the second joint abutment 19, thereby preventing an undesirable energy input into the primary wheel 1 and/or the drive gear 7 during welding.

In the illustrated example the axial end of the second sheet metal component 4.2 facing away from the joint abutment 5 is cantilevered since the second sheet metal component 4.2 is held exclusively in the area of its first axial end at which the joint abutment 5 is defined—in the existing example by way of being welded together with the first sheet metal component 4.1 and by being supported on the outside circumference of the primary wheel 1. The second sheet metal component 4.2 has a predetermined distance at all locations in relation to the secondary wheel 2.

As can be seen in FIG. 1, the two sheet metal components 4.1, 4.2 are each bell shaped in the illustrated embodiment and starting from the joint abutment 5 extend first in axial direction of the hydrodynamic direction and then in radial direction radially toward the inside—in the existing example over the central diameter of the operating space 3. Thereby the radial outer half of the operating space 3 is surrounded by the housing 4 which consists of the two sheet metal parts 4.1, 4.2.

Because the formation of the two sheet metal components 4.1, 4.2 is completed before they are installed in the hydrodynamic coupling, it is necessary to first place the first sheet metal component 4.1 onto the primary wheel 1 before the drive gear 7 is installed. Based on the provision to screw the drive gear 7 into the drive shaft 9, whereby alternatively it could also be screwed on, the first sheet metal component 4.1 is welded together with the drive gear 7 advantageously only when said drive gear 7 is completely screwed into or onto the drive shaft 9.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A hydrodynamic machine for a turbine compound system, said hydrodynamic machine comprising:
   a bladed primary wheel;
   a bladed secondary wheel, said bladed primary and secondary wheels together forming a work space;
   a housing which encloses said bladed primary wheel and said bladed secondary wheel and which includes sheet metal, said housing including at least two individual sheet metal components which are placed on at least one of said bladed primary wheel and said bladed secondary wheel, which are aligned with each other at a joint abutment, and which are welded together to form a welded said joint abutment; and
   a relief in an area of the hydrodynamic machine associated with said welded joint abutment, said relief being open toward said welded joint abutment and extending along said welded joint abutment in a surface of at least one of said bladed primary wheel and said bladed secondary wheel.

2. The hydrodynamic machine according to claim 1, wherein the hydrodynamic machine is a hydrodynamic coupling.

3. The hydrodynamic machine according to claim 1, wherein said sheet metal components abut in an axial direction of the hydrodynamic machine and together specifically enclose said primary wheel and said secondary wheel in said axial direction therebetween.

4. The hydrodynamic machine according to claim 3, further comprising a component, wherein said at least two individual sheet metal components include a first sheet metal component and a second sheet metal component, said first sheet metal component being welded to said component which rotates with one of said primary wheel and said secondary wheel and which specifically is one of positively connected and friction-locked to one of said primary wheel and said secondary wheel, said second sheet metal component being specifically exclusively welded to said first sheet metal component.

5. The hydrodynamic machine according to claim 4, wherein said second sheet metal component includes a first end and a second end, said second end being a welded axial end, said second sheet metal component being cantilevered at said first end which is opposite said welded axial end, said second sheet metal component being supported by said first sheet metal component and at least one of said primary wheel and said secondary wheel.

6. The hydrodynamic machine according to claim 5, wherein said second sheet metal component is supported exclusively by said first sheet metal component and at least one of said primary wheel and said secondary wheel.

7. The hydrodynamic machine according to claim 5, wherein said second sheet metal component is supported by said first sheet metal component and said primary wheel, said primary wheel being enclosed in a circumferential direction by said first sheet metal component.

8. The hydrodynamic machine according to claim 4, wherein said component which is welded to said first sheet metal component is a drive wheel for the hydrodynamic machine.

9. The hydrodynamic machine according to claim 4, wherein said component which is welded to said first sheet metal component is a drive gear for the hydrodynamic machine.

10. The hydrodynamic machine according to claim 1, wherein at least one of said primary wheel and said secondary wheel includes aluminum.

11. The hydrodynamic machine according to claim 1, wherein at least one of said primary wheel and said secondary wheel includes pressure die cast aluminum.

12. The hydrodynamic machine according to claim 1, wherein said housing includes exclusively two said sheet metal components, said two sheet metal components being bell-shaped and extending at least over a radial outer half of said work space.

13. A method for the production of a hydrodynamic machine for a turbine compound system, said method comprising the steps of:
   providing that the hydrodynamic machine includes:
      a bladed primary wheel;
      a bladed secondary wheel, said bladed primary and secondary wheels together forming a work space;
      a housing which encloses said bladed primary wheel and said bladed secondary wheel and which includes sheet metal, said housing including a first sheet metal component and a second sheet metal component which are aligned with each other at a welded joint abutment, each of said first and second sheet metal components including respectively a connecting edge; and
      a relief in an area of the hydrodynamic machine associated with said welded joint abutment, said relief being open toward said welded joint abutment and extending along said welded joint abutment in a surface of at least one of said bladed primary wheel and said bladed secondary wheel;
   manufacturing said first and second sheet metal components separately from other components in the hydrodynamic machine;
   placing said first and second sheet metal components on said primary wheel and said secondary wheel so that said first and second sheet metal components at least one of are located with said connecting edges opposite each other over said relief and touch each other; and
   welding said first and second sheet metal components to each other on opposing said connecting edges to form said welded joint abutment.

14. The method according to claim 13, wherein said first and second sheet metal components are placed onto said primary wheel and said secondary wheel from axially outside from opposite directions so that said first and second sheet metal components enclose said primary wheel and said secondary wheel between said first and second sheet metal components in an axial direction of the hydrodynamic machine.

15. The method according to claim 14, wherein a component rotating with one of said primary wheel and said secondary wheel is placed on one of said primary wheel and said secondary wheel also from outside in a same said axial direction as said first sheet metal component after said first sheet metal component is placed, so that said first sheet metal component is captively held on a respective one of said primary wheel and said secondary wheel and said component is welded together with said first sheet metal component.

16. The method according to claim 15, wherein said component is a drive gear.

* * * * *